United States Patent [19]
von Broock

[11] Patent Number: 4,840,330
[45] Date of Patent: Jun. 20, 1989

[54] SUSPENSION SYSTEM FOR A DRIVE ASSEMBLY OF A HELICOPTER

[75] Inventor: Ulrich von Broock, Weissach, Fed. Rep. of Germany

[73] Assignee: Dr. Ing. h.c.F. Porsche Aktiengesellschaft, Stuttgart, Fed. Rep. of Germany

[21] Appl. No.: 162,122

[22] Filed: Feb. 29, 1988

[30] Foreign Application Priority Data

Feb. 27, 1987 [DE] Fed. Rep. of Germany ....... 3706379

[51] Int. Cl.$^4$ .............................................. B64C 27/00
[52] U.S. Cl. .................................. 244/17.27; 188/378; 74/574; 248/568; 416/500
[58] Field of Search ............... 244/17.17, 54; 248/638, 248/659-662, 665, 667, 666, 669, 561, 562, 564, 567, 556, 557; 188/1 B; 74/574, 586; 416/500, 244 R, 134

[56] References Cited
U.S. PATENT DOCUMENTS 4,088,042 5/1978 Desjardins et al. ............... 244/17.27
4,111,386 9/1978 Kenigsberg et al. ............. 244/17.27
4,274,510 6/1981 Mouille et al. ........................ 244/54

Primary Examiner—Joseph F. Peters, Jr.
Assistant Examiner—Jesús D. Sotelo
Attorney, Agent, or Firm—Barnes & Thornburg

[57] ABSTRACT

A suspension system having elastic bearings for a drive assembly of a helicopter is described that has a belt drive that is arranged between an output shaft and a main rotor. This belt drive comprises a first drum that is connected with the output shaft and a second drum that is connected with an angular drive for the main rotor. Both drums are connected with respect to the drive by a tensionable belt. The suspension system comprises at least two bearings in the area of the belt drums as well as another bearing at the end of the assembly 1 that faces away from the belt drums. The three bearings have a spring rigidity coordination that controls the permitted rigid-body movements of the assembly. This coordination is such that limited swivel movements of the assembly can be carried out around the longitudinal axes of the belt drums as well as parallel lifting movements of the assembly can be carried out in vertical direction.

12 Claims, 2 Drawing Sheets

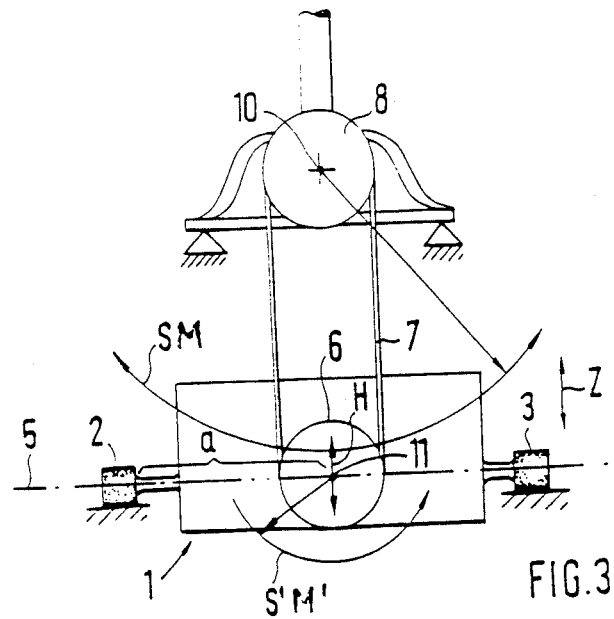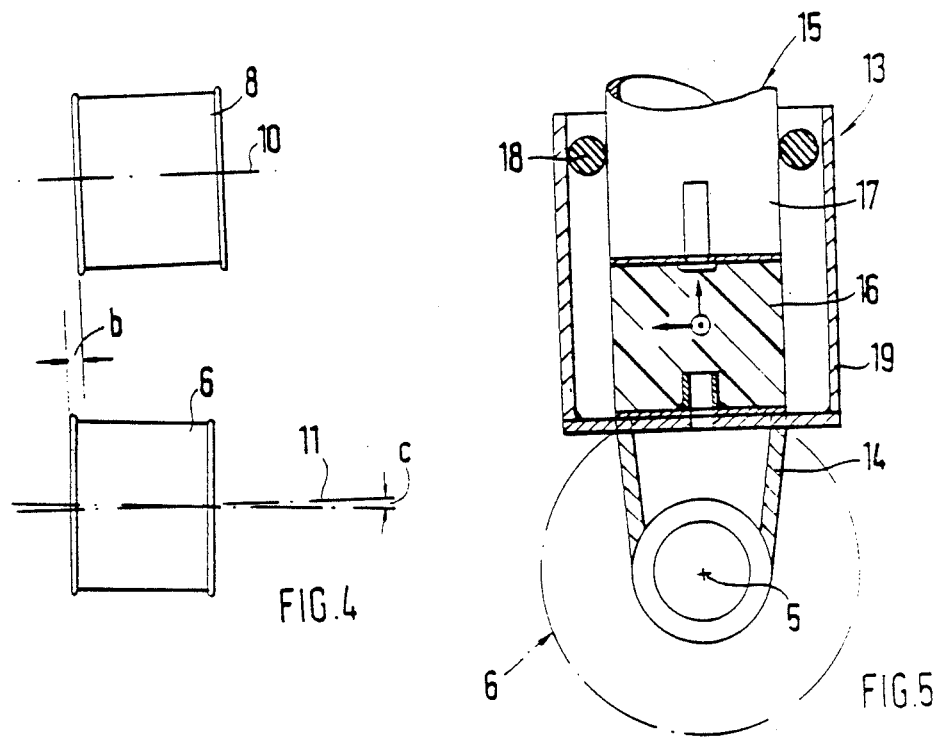

SUSPENSION SYSTEM FOR A DRIVE ASSEMBLY OF A HELICOPTER

BACKGROUND AND SUMMARY OF THE INVENTION

The invention relates to a suspension system for a drive assembly of a helicopter of the type utilizing a belt drive arranged between an engine output shaft and a main helicopter rotor.

A drive concept of a helicopter has been contemplated that comprises a first belt drum that is connected with the transmission output shaft and a second belt drum that is connected with an angular gear of the main rotor. A flat belt that surrounds the two drums drives the angular gear located above the engine and thus the main rotor. When the engine is started, the belt is shifted for the disconnecting of the angular momentum from the engine. Then the pilot tightens the belt by means of a device, whereby the rotor is set into rotation.

By the tightening of the belt, the engine is pulled upward and as a result of the simultaneously occurring output torque, it twists around its longitudinal axes in its elastic suspension. As a result, the lower belt drum loses its parallelism with the upper belt drum, and a quiet and wear-resistant movement of the belt is not longer ensured. In order to avoid these disadvantages, rubber metal elements having extremely hard spring rigidities are provided in the case of previously contemplated suspensions for the helicopter engine, having the purpose of carrying the weight and supporting the torque. An additional elastic support that connects the two belt drums with one another has the purpose of ensuring their exact positioning.

The use of bearing elements with an extremely high spring rigidity therefore no longer permit a satisfactory insulation of the vibrations on the side of the engine.

It is an objective of the invention to provide an improved elastic suspension system for a drive assembly of a helicopter that ensures an insulation of the vibrations induced by the engine and nevertheless ensures an exact alignment of the belt drum for a quiet movement of the belt.

According to the invention, this objective is achieved by constructing the bearing system with two spaced bearing in the area of the belt drums and another bearing at the opposite end of the engine, the bearings having their rigidity coordinated such that limited swivel movements of the assembly around the drum axes are facilitated along with lifting movements.

A principal advantage achieved by means of the preferred embodiments of the invention are essentially that, also when soft, well-insulating bearings are used, the parallelism of the belt drums is ensured. The arrangement of the bearings at the engine and the coordination of the rigidities permit only rigid-body movements that do not have any disadvantageous effect on the movement of the belt.

Thus, it is permitted that the engine can swivel around the longitudinal axes of the two belt drums, and a parallel lifting movement of the assembly is possible to a limited degree. What is prevented, however, is a twisting of the engine around its transverse axes (pitch) and around its vertical axes (yaw) as well as an axial shifting in the direction of the crankshaft.

Between the two belt drums, an additional support may be provided that absorbs the belt tension and that, in the case of different load conditions, aligns the belt drums in parallel to one another, according to certain preferred embodiments. If the output shaft is reinforced, embodiments are also contemplated where such support is left out.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic partial rear view of the engine and bearing assembly of FIG. 1 and 2, depicting the permitted rigid-body movements results during use of same;

FIG. 4 is a diagrammatic representation of the belt drums with a permitted deviation of the parallelism utilizing the preferred embodiments of the present invention; and FIG. 5 is a schematic part sectional partial schematic view of the lower part of a support with the connecting part and the journal bearing of the embodiment of FIGS. 1 through 4.

DETAILED DESCRIPTION OF THE DRAWINGS

Figure 1:
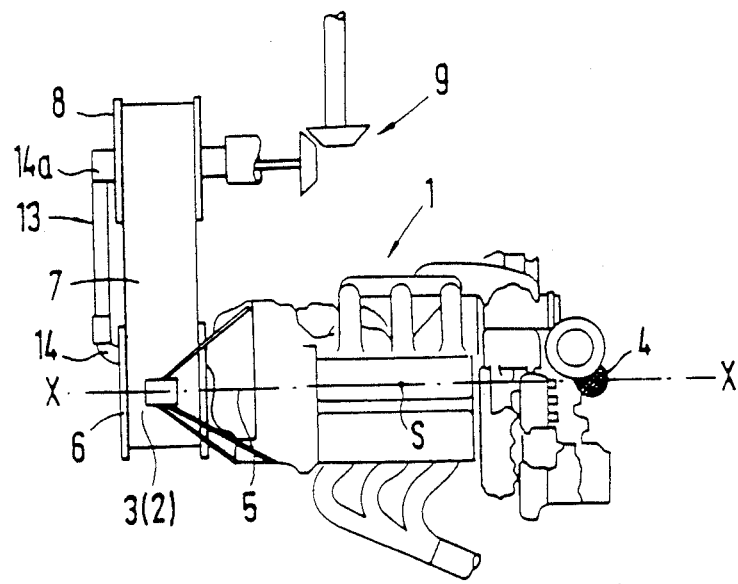
FIG. 1 is a lateral schematic view of a helicopter engine that is disposed in three elastic bearings and has belt drums on the rear side constructed according to a preferred embodiment of the present invention.
Figure 2:
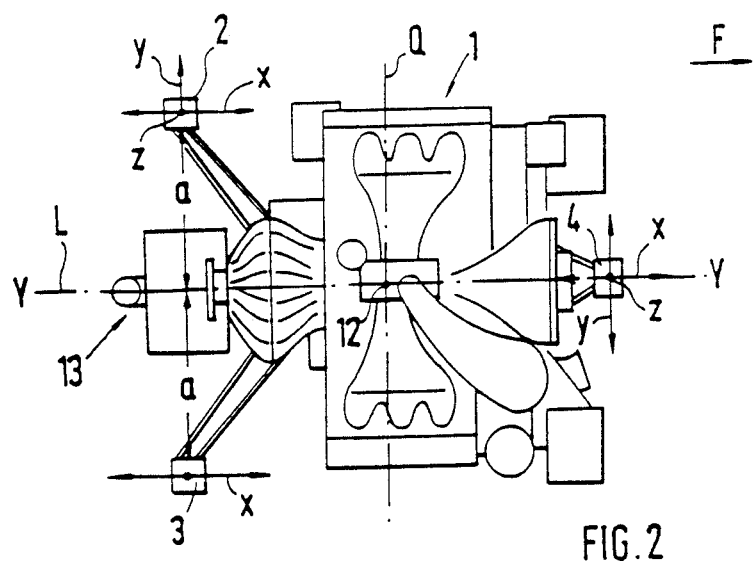
FIG. 2 is a schematic top view of the engine and bearing assembly according to FIG. 1, with some parts removed to facilitate the illustration.

FIGS. 1 and 2 show a suspension system for a drive assembly 1 of a helicopter that, on the side of the airframe, is supported in three bearings 2, 3, and 4. A first belt drum 6 is connected with the assembly 1 via an output shaft 5. This belt drum 6, with respect to the drive, can be connected with a second belt drum 8 via a flat belt 7. This second drum 8 drives a main rotor via an angular gear 9 that is shown in diagram form. The output shaft 5 may be the crankshaft or the transmission output shaft according to respective different preferred embodiments of the invention.

The suspension system comprises at least two bearings 2 and 3 in the area of the belt drums 6 and 7 that—viewed in flying direction F—are arranged at the rear end of the assembly 1. Another bearing 4 is arranged at the end of the assembly 1 that faces away from the felt drums 6 and 7.

The three bearings 2, 3 and 4 are held in a horizontal plane X—X with the output shaft 5, in which case this plane X—X is located approximately at the level of the center of gravity S of the assembly 1. With respect to the longitudinal center axes L of the assembly 1, the two bearings 2 and 3 are arranged at the same distance a from this axes, in which case the single bearing 4 is locatd in the longitudinal center axes L.

For the desired coordination of the rigid-body movements of the assembly 1, the individual elastic bearings 2, 3 and 4 have the following spring rigidities: Bearings 2 and 3, in direction x, that corresponds to the flying direction F, and in transverse direction y, have a softer spring rigidity than in vertical direction z. They are used for the torque support as well as for the absorption of belt prestressing forces. The bearing 4, in vertical direction z and in transverse direction y, has a softer spring rigidity than in direction x. The softer characteristic in vertical direction z is possible because this bearing carries no significant load. In contrast, it must be hard in flying direction F so that no shifting of the assembly 1 can take place in flying direction F and thus the drums can take up no position that is shifted in axial direction.

As shown in detail in FIG. 3, a targeted movement of the assembly 1 is permitted by means of the coordination of the bearing characteristic. Thus, when it is excited, the assembly 1 can carry out a swivel motion SM around the axes 10 of the upper belt drum 8 and a swivel motion S'M' around the axes 11 of the belt durm 6, and a parallel lifting motion H in vertical direction z without any impairment of functions. The rigidity coordination of bearings 2, 3 and 4 avoids a twisting of the assembly around a transverse axes Q (pitch), around a vertical axes 12 (yaw) and an axial shifting in the direction of the crankshaft.

By means of the coordinated bearings 2, 3 and 4, as shown in diagram form in FIG. 4, such a course of the two axes 10 and 11 of the belt drums 8 and 6 with respect to one another is ensured that an adjustment of axes 11 with respect to axes 10 can take place only within the permissible basic values b and c.

The drums 6 and 8 are connected with one another via a support 13, as shown particularly in FIG. 1. It comprises a lower connecting part 14a that is connected with the lower drum 6. Between this connecting part 14 and a rod 15 that, at the end face, is fastened at the other drum 8 by means of an additional connecting part 14a, an elastic journal bearing 16 is provided. In vertical direction, it is relatively hard, and in radial directions, it is developed with a significantly softer spring rigidity. The lower connecting part 14 of the support 13 consists of a cylindrical shell 19, in which a lower end 17 of the rod is supported via at least one elastic ring 18 to avoid buckling. This support 13 serves for providing desired stability in certain preferred embodiments.

However, in certain other preferred embodiments with a change of the transmission, particularly with the output shaft 5 being dimensioned corresponding to the occurring transverse forces, the support 13 can be dispensed with. The elimination of support 13 will not adversely impair the effect of the suspension system in such embodiments.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A suspension system having elastic bearings for a drive assembly of a helicopter having a belt drive that is arranged between an engine output shaft and a main rotor and comprises a first drum connected with the output shaft and a second drum connected with an angular drive, said drums being connected in a tensionable belt drive, wherein the suspension system has at least two bearing means in the area of the belt drums and another bearing means at the end of the drive assembly that faces away from the belt drums, and wherein said bearing means have a spring rigidity coordination in horizontal and vertical directions for providing limited swivel movements of the assembly around the longitudinal axes of the belt drums as well as parallel lifting movements in the vertical direction.

2. A suspension system according to claim 1, wherein:
 (a) the three bearing means are arranged in a horizontal plane with the output shaft,
 (b) the horizontal plane is located approximately at the level of the center of gravity of the drive assembly,
 the another bearing means is arranged in a vertical plane with the output shaft of the drive assembly, and
 the two bearing means are held at the same distance from the longitudinal center axis of the drive assembly.

3. A suspension system according to claim 2, wherein:
 (a) the bearing means in the area of the drums have a softer spring rigidity in the flying direction and in transverse direction than they have in the vertical direction, and
 (b) the another bearing means at the other end of the drive assembly has a soft spring rigidity in vertical direction and in transverse direction, but is developed to be harder in flying direction .

4. A suspension system according to claim 2, wherein a support is provided between a connecting part at the first belt drum and another connecting part at the second belt drum.

5. A suspension system according to claim 1, wherein:
 (a) the bearing means in the area of the drums have a softer spring rigidity in the flying direction and in transverse direction than they have in the vertical direction, and
 (b) the another bearing means at the other end of the drive assembly has a soft spring rigidity in vertical direction and in transverse direction, but is developed to be harder in flying direction.

6. A suspension system according to claim 5, wherein a support is provided between a connecting part at the first belt drum and another connecting part at the second belt drum.

7. A suspension system according to claim 6, wherein the support comprises a rod that is connected by means of an elastic journal bearing with the connecting part, and the elastic journal bearing is developed to be relatively hard in vertical direction and relatively soft in radial direction.

8. A suspension system according to claim 7, wherein the connecting part comprises a cylindrical shell in which a lower end of the rod is held that is supported by means of at least one elastic ring.

9. A suspension system according to claim 1, wherein a support is provided between a connecting part at the first belt drum and another connecting part at the second belt drum.

10. A suspension system according to claim 9, wherein the support comprises a rod that is connected by means of an elastic journal bearing with the connecting part, and the elastic journal bearing is developed to be relatively hard in vertical direction and relatively soft in radial direction.

11. A suspension system according to claim 10, wherein the connecting part comprises a cylindrical shell in which a lower end of the rod is held that is supported by means of at least one elastic ring.

12. A suspension system according to claim 9, wherein the connecting part comprises a cylindrical shell in which a lower end of the rod is held that is supported by means of at least one elastic ring.

* * * * *